United States Patent [19]
Knight

[15] 3,707,187
[45] Dec. 26, 1972

[54] FLOODING METHOD USING SALT-INSENSITIVE POLYMERS FOR BETTER MOBILITY CONTROL
[72] Inventor: Bruce L. Knight, Littleton, Colo.
[73] Assignee: Marathon Oil Company, Findlay, Ohio
[22] Filed: June 25, 1971
[21] Appl. No.: 156,937

[52] U.S. Cl. .................................166/246, 166/273
[51] Int. Cl. .............................................E21b 43/22
[58] Field of Search.......................166/246, 273, 274

[56] References Cited
UNITED STATES PATENTS

| | | | |
|---|---|---|---|
| 3,053,765 | 9/1962 | Sparks | 166/274 |
| 3,087,539 | 4/1963 | Maurer, Jr. | 166/274 |
| 3,305,016 | 2/1967 | Lindblom et al. | 166/246 |
| 3,434,542 | 3/1969 | Dotson et al. | 166/273 |
| 3,437,141 | 4/1969 | Brandner et al. | 166/273 |
| 3,467,187 | 9/1969 | Gogarty et al. | 166/273 |
| 3,512,586 | 5/1970 | Holm | 166/273 |
| 3,532,166 | 10/1970 | Williams | 166/274 |
| 3,581,824 | 6/1971 | Hurd | 166/246 |

Primary Examiner—Stephen J. Novosad
Attorney—Joseph C. Herring et al.

[57] ABSTRACT

Improved flooding of an oil-bearing subterranean reservoir with an aqueous slug containing a salt-sensitive polymer (example of such a polymer is a partially hydrolyzed, high molecular weight polyacrylamide) and a subsequent drive water which, due to the salt content, tends to degrade the back portion of the aqueous polymer slug, is realized by following the aqueous, salt-sensitive polymer slug with a sufficient volume of an aqueous biopolymer slug to "insulate" the salt-sensitive polymer from the drive water. Drive water having salt concentrations above 1,000 ppm (parts per million) of TDS (total dissolved solids) and especially those waters containing above 50 ppm of polyvalent cations, tends to adversely affect the mobility reducing capabilities of a salt-sensitive polymer. More efficient mobility control is obtained by interjecting the biopolymer slug between the salt-sensitive polymer slug and the drive water. Optionally, a miscible or miscible-like slug can precede the salt-sensitive polymer slug.

10 Claims, No Drawings

FLOODING METHOD USING SALT-INSENSITIVE POLYMERS FOR BETTER MOBILITY CONTROL

CROSS REFERENCE TO RELATED APPLICATIONS

U.S. Pat. application titled "Economical Mobility Control in Oil Recovery Processes", U. S. Ser. No. 76,140, filed Sept. 28, 1970, inventor Bruce L. Knight, defines improved mobility control by following an aqueous slug containing a polyelectrolyte with an aqueous slug containing a biopolymer. The polyelectrolyte tends to reduce the permeability of the formation while the biopolymer increases the viscosity of the water, thus a two-flow effect is obtained.

BACKGROUND OF THE INVENTION

1. Field of the Invention

This invention relates to improved mobility control wherein an aqueous, salt-sensitive polymer slug is injected into an oil-bearing subterranean formation and displaced toward a production means to recover crude oil therethrough. The polymer slug can be preceded by a miscible or miscible-like displacing slug, e.g. a micellar dispersion or any slug which will displace oil. This invention teaches that an aqueous biopolymer slug injected behind the aqueous salt-sensitive polymer slug is useful to protect the polymer from being degraded due to a subsequently injected drive water containing relatively large concentrations of electrolyte, e.g. above 1,000 ppm of salts.

2. Prior Art to the Invention

It is known that high molecular weight polyelectrolytes, such as the partially hydrolyzed, high molecular weight polyacrylamides, are useful to obtain improved mobility control and increase oil recoveries in an oil-recovery process. However, these polyelectrolytes are generally salt-sensitive, i.e. relatively high concentrations of salt tend to adversely influence the mobility control imparted by these polymers to aqueous flooding systems. For example, concentrations above 1,000 ppm of salt in the water, on contact with an aqueous slug containing the polyelectrolyte, tend to reduce the desired mobility effectiveness which the polyelectrolyte imparts to the aqueous solution. To overcome this adversity, larger concentrations of the polyelectrolyte are generally added to the aqueous solution.

In some reservoirs, where the salt concentration of the drive water can reach 100,000 ppm, and even with salt concentrations above 50 ppm of divalent cations, the economics of a waterflooding process or any flooding process using salt-sensitive polymers is questionable.

SUMMARY OF THE INVENTION

Applicant has discovered a novel process for improving the mobility control of an oil-recovery process wherein a salt-sensitive polymer is used to impart mobility control. This is accomplished by injecting after the aqueous polymer slug, e.g. an aqueous solution containing a partially hydrolyzed, high molecular weight polyacrylamide, a "buffer" slug or "insulating" slug, e.g. 1–50 per cent formation pore volume, containing a biopolymer. The effect of the biopolymer is to prevent a subsequent drive water which contains sufficient amounts of salt from adversely influencing the mobility characteristics the polymer normally imparts to the aqueous slug. A miscible or miscible-like slug can be injected previous to the salt-sensitive polymer slug, e.g. in a tertiary recovery process.

PREFERRED EMBODIMENTS OF THE INVENTION

The salt-sensitive polymers to which this invention relates are those used to impart desired mobility control to oil recovery processes. In general, these salt-sensitive polymers are known as mobility buffer agents, viscosity imparting agents, or thickening agents for aqueous solutions the processes in which they are used result in increases in oil recovery attributed mostly to improvement in pattern sweep and conformance or merely improved mobility control of the oil recovery process. Examples of such polymers include the partially hydrolyzed, high molecular weight polyacrylamides marketed under the trade name "Pusher" polymers by Dow Chemical Company, Midland, Mich. Other examples of such polymers include partially hydrolyzed, high molecular weight polyacrylamides marketed under the trade names "Uni-Perm" and "HiVis" by Betz Laboratories, Inc., Trevose, Pa., and partially hydrolyzed, high molecular weight polyacrylamides marketed as Calgon 454 by Calgon Corp., Pittsburgh, Pa. The salt-sensitive polymers in aqueous solutions are adversely influenced by high salt concentrations, i.e. the viscosity of the aqueous solution is degraded and permeability reduction capability is also reduced. For example, a 700 ppm solution of Dow 700 Pusher polymer in water containing 500 ppm of total dissolved solids, has a Brookfield viscosity of about 30 cp at 72°F; but, the same polymer concentration in 2% NaCl solution has a viscosity of 4 cp at the same temperature. Also, certain salts can precipitate the polymer out of solution, e.g. polymer is precipitated when an aqueous solution containing 700 ppm of Dow 700 Pusher polymer comes in contact with water containing 200 ppm of $Fe^{+++}$ ion.

In general, these salt-sensitive polymers are used in processes to obtain increased oil recovery due to improvement in pattern sweep and conformance, mobility control with or without another fluid bank, etc.

The aqueous slug of injected polymer is displaced by a drive water. Where the drive water contains large concentrations of salts (e.g. above 500–1,000 ppm), the front portion of the drive water tends to degrade the aqueous slug containing the salt-sensitive polymer, and an inefficient process results.

Where the salt-sensitive polymer is used in conjunction with a previously injected miscible or miscible-like displacing slug, retention of the mobility control imparted by the salt-sensitive polymer is important. U. S. Pat. Nos. 3,254,714 to Gogarty et al; 3,497,006 to Jones et al; and 3,506,070 to Jones are examples of such a process. Examples of displacing slugs useful before the polymer slug include anhydrous soluble oils, hydrous soluble oils, miscible slugs such as alcohol, aldehyde, LPG, or like slug, etc.

The salt-sensitive polymer is generally injected in an aqueous solution slug in concentrations of about 100 to about 5,000 and preferably 200 to about 2,000 and most preferably about 500 to about 1,500 ppm.

Volume amounts of the aqueous slug include about 20 to about 100 per cent, preferably 30 to 70 per cent, and most preferably 35 to 55 per cent formation pore volume. The particular formation, the economics of the overall process, i.e. the value of the crude oil, the rate of return on investment, etc., will govern the volume amount of aqueous polymer slug injected and also the concentration of the polymer. Also, the salt or electrolyte concentration within the interstitial water will dictate the concentration of polymer, i.e., a high concentration is needed where the salt concentration is relatively high in the interstitial water.

Applicant's invention involves injecting behind the aqueous salt-sensitive polymer slug an aqueous biopolymer slug to substantially protect the salt-sensitive polymer from the salts of electrolytes within the drive water. Volume amounts of such a protective slug include 1 to 50 per cent, preferably 2 to 30 per cent and more preferably 5 to 20 per cent formation pore volume. The protective slug can contain about 25 to 1,000 or greater, preferably 75 to 800, and more preferably 150 to 700 ppm of the biopolymer. Of course, where the drive water contains a relatively large concentration of salts or electrolytes, e.g. 100,000 ppm, the concentration of the biopolymer and the volume of the biopolymer should be increased. Examples of useful biopolymers include polysaccharides and derivatives thereof. A specific example is Kelzan-M, a polysaccharide polymer marketed by Xanco Division of Kelco Chemical Co., San Diego, Calif., U.S.A. Other like polymers which are not substantially sensitive to the salts in the interstitial water are also useful within the protective slug. Other additives may be incorporated into the slug, such as corrosion inhibitors, oxygen scavengers, etc.

After the slug containing the salt-sensitive polymer and the slug containing the biopolymer are injected into the reservoir, drive water is injected to displace the previous two slugs toward the production well to recover crude oil therethrough. As mentioned earlier, a miscible or miscible-like slug can be injected into the formation previous to the injection of the salt-sensitive polymer. The concentration of salts within the drive water, to be applicable with this invention, are those containing above 500 and preferably above 1,000 and can contain up to 100,000 ppm or more of total dissolved solids within the water. Generally speaking, the drive water always has a higher salt concentration than the water needed to make up the salt-sensitive polymer solution. This is understandably so, since you would not use a high concentration of salt within the water as a diluent with a salt-sensitive polymer. Therefore, the salt concentration within the drive water is, without exception, greater than the salt concentration within the salt-sensitive polymer diluent. Also, the drive water can contain a relatively high concentration of divalent cations, e.g. calcium and magnesium; this concentration may be greater than 50 ppm. By using the aqueous slug containing the biopolymer, the high concentration of salt within the drive water is buffered from adversely influencing the mobility characteristics imparted by the salt-sensitive polymer to the aqueous polymer slug.

The following examples are presented to teach working embodiments of the invention. Unless otherwise specified, all percents are based on volume.

EXAMPLE I

A Berea slab core 2-feet wide, 2-feet long and 2-inches thick represents one-quarter of a confined five-spot pattern. The slab is first saturated with brine, then flooded to irreducible water saturation with crude oil having a viscosity of about 6 cp at ambient temperature. Thereafter, the core is waterflooded to residual oil saturation with the brine. The core is then flooded with various fluids in the following sequence:

1. 5 per cent formation pore volume of a micellar dispersion containing 9.6 per cent petroleum sulfonates (average equivalent weight about 420, about 62 per cent active), 38 per cent of crude oil (viscosity = 9 cp at ambient temperature), 50 per cent aqueous medium, 1.0 per cent primary hexanol, and 1.4 per cent primary amyl alcohol;
2. 5 per cent formation pore volume of an aqueous solution containing 2400 ppm of Dow 700 Pusher polymer;
3. 25 per cent formation pore volume of an aqueous slug containing 600 ppm of Dow 700 Pusher polymer;
4. 20 per cent formation pore volume of an aqueous slug containing 200 ppm of Kelzan-M; and thereafter,
5. drive water containing 12,000 ppm of total dissolved solids.

The water used as the diluent in 2, 3, and 4 contains up to 500 ppm of salts. The drive water is injected until oil production ceases. About 72 per cent of the oil is recovered from the slab.

EXAMPLE II

The procedure of Example I is repeated except Dow 700 Pusher polymer is substituted for the Kelzan-M material. In this case, only 55 per cent of the oil is recovered, even though the total amount of polymer injected in both cases is the same.

Example II, as compared to Example I, indicates that the aqueous slug of the biopolymer is very beneficial to improve oil recovery wherein a drive water containing high concentrations of salts is used and a salt-sensitive polymer is used.

It is not intended that this invention be limited by the specifics taught above. Rather, all equivalents obvious to those skilled in the art are intended to be incorporated within the scope of the invention as defined within the specification and appended claims.

What is claimed is:

1. An improved process for recovering crude oil from an oil-bearing subterranean formation wherein an aqueous slug containing a salt-sensitive polymer is injected into the formation to impart desired mobility control to the process and the slug is displaced by a water drive toward a production well to recover crude oil therethrough and wherein the drive water contains a sufficient salt concentration to adversely influence the mobility characteristic imparted by the salt-sensitive polymer, the improvement comprising injecting after the aqueous slug and before the drive water, sufficient amounts of an aqueous slug containing a biopolymer to substantially protect the salt-sensitive polymer in the back portion of the aqueous slug from being degraded by the salts within the drive water.

2. The process of claim 1 wherein the salt-sensitive polymer is a partially hydrolyzed, high molecular weight polyacrylamide.

3. The process of claim 1 wherein about 1 to about 50 per cent formation pore volume of the aqueous slug containing the biopolymer is injected into the formation.

4. The process of claim 1 wherein about 2 to about 30 per cent formation pore volume of the aqueous slug containing the biopolymer is injected into the formation.

5. The process of claim 1 wherein the biopolymer concentration in the aqueous slug is about 25 to about 1,000 ppm.

6. The process of claim 1 wherein a micellar dispersion is injected into the formation previous to the injection of the aqueous slug containing the salt-sensitive polymer.

7. An improved process for recovering crude oil from an oil-bearing subterranean formation wherein an aqueous slug containing a partially hydrolyzed, high molecular weight polyacrylamide is injected into the formation to impart desired mobility control to the process, and wherein the aqueous slug is displaced by a drive water toward a production means to recover crude oil therethrough and wherein the water drive contains a salt concentration above about 500–1,000 ppm which adversely influences the mobility characteristics imparted by the polyacrylamide, the improvement comprising injecting after the aqueous polyacrylamide slug about 1 to about 50 per cent formation pore volume of an aqueous slug containing a biopolymer.

8. The process of claim 7 wherein the biopolymer concentration is about 25 to about 1,000 ppm within the aqueous slug containing the biopolymer.

9. The process of claim 7 wherein a micellar dispersion is injected previous to the injection of the aqueous slug containing the polyacrylamide.

10. The process of claim 7 wherein about 2 to about 30 per cent formation pore volume of the aqueous slug containing the biopolymer is injected.

\* \* \* \* \*